United States Patent
Torres (10) Patent No.: US 11,420,295 B2
(45) Date of Patent: Aug. 23, 2022

(54) EXOTHERMIC CUTTING ROD WITH IGNITION WINDOW

(71) Applicant: Broco, Inc., Ontario (CA)

(72) Inventor: Diego Adolfo Torres, Upland, CA (US)

(73) Assignee: Broco, Inc., Ontario (CA)

( * ) Notice: Subject to any disclaimer, the term of this patent is extended or adjusted under 35 U.S.C. 154(b) by 441 days.

(21) Appl. No.: 16/692,818

(22) Filed: Nov. 22, 2019

(65) Prior Publication Data

US 2020/0298347 A1 Sep. 24, 2020

Related U.S. Application Data

(60) Provisional application No. 62/822,516, filed on Mar. 22, 2019.

(51) Int. Cl.
| | | |
|---|---|---|
| *B23K 35/02* | (2006.01) | |
| *E21B 7/14* | (2006.01) | |
| *F02M 57/06* | (2006.01) | |
| *F02B 75/12* | (2006.01) | |
| *F24V 30/00* | (2018.01) | |
| *F02P 23/04* | (2006.01) | |

(52) U.S. Cl.
CPC .......... *B23K 35/0216* (2013.01); *E21B 7/146* (2013.01); *F02B 2075/125* (2013.01); *F02M 57/06* (2013.01); *F02P 23/04* (2013.01); *F23D 2207/00* (2013.01); *F24V 30/00* (2018.05)

(58) Field of Classification Search
CPC ........ B23K 35/0216; E21B 7/146; F41H 9/02
USPC ................................................. 266/48; 431/91
See application file for complete search history.

(56) References Cited

U.S. PATENT DOCUMENTS

| | | | | |
|---|---|---|---|---|
| 4,055,332 A | * | 10/1977 | Sweeney | E21B 7/146 148/198 |
| 4,985,610 A | * | 1/1991 | Rucker | B28D 1/221 219/69.1 |
| 9,849,536 B2 | | 12/2017 | Hansen et al. | |
| 10,155,275 B2 | | 12/2018 | Hansen et al. | |

* cited by examiner

*Primary Examiner* — Vivek K Shirsat
(74) *Attorney, Agent, or Firm* — Kevin Schraven; Anooj Patel; Hankin Patent Law, APC (57) ABSTRACT

An exothermic cutting rod comprising an ignition assembly portion and a main portion. The main portion may comprise a plurality of fuel rods and a rod housing that is configured to allow a flow of oxygen to the ignition assembly portion. The ignition assembly portion may comprise an ignition fuel housing and an ignition fuel, which is entirely contained within said exothermic cutting rod. The ignition fuel housing may have one or more windows that are configured to allow a heat source to ignite the ignition fuel, which then in turn ignites the fuel rods.

17 Claims, 6 Drawing Sheets

EXOTHERMIC CUTTING ROD WITH IGNITION WINDOW

CROSS-REFERENCE TO RELATED APPLICATIONS

This Patent Application claims the benefit of and priority to U.S. Provisional Patent Application No. 62/822,516, filed Mar. 22, 2019, titled Exothermic Cutting Rod With Ignition Window, the contents of which is expressly incorporated herein by this reference as though set forth in its entirety and to which priority is claimed.

FIELD OF USE

The present disclosure relates generally to cutting torches and, in particular, exothermic cutting rods with one or more ignition windows that are used for cutting metals and other objects and materials.

BACKGROUND

Exothermic rods, which are also referred to as oxygen lances, burning bars, and thermal lances, are tools that create extremely high temperatures to facilitate the cutting of other materials. In order to create temperatures high enough to cut a wide array of particularly durable materials, the exothermic rod utilizes compressed oxygen and burning steel. The rear end of the rod usually consists of a holder which funnels the compressed oxygen through the rod towards the cutting end. The cutting end of the rod is ignited and the fuel combination of oxygen and burning steel produces temperatures up to, or in excess of, 10,000° F. Some exothermic rods have an open end with the ignition fuel poking outside the rod. This makes the end subject to being damaged and/or difficult to control. Thus, a need in the art for an exothermic rod with a closed end, with no fuel outside the rod that a user can ignite in an easier and safer manner.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In one embodiment the device of the present disclosure may be an exothermic cutting rod with one or more ignition windows. The hole may be in the housing of the rod near the cutting end. Preferably, the hole(s) exposes easy-to-ignite materials that are entirely contained within the housing of the rod. This hole may also allow oxygen to vent out of the device.

In another embodiment of the present disclosure, the exothermic cutting rod has a metallic or plastic tube through which oxygen travels. The inside of the tube contains a type of steel or other metal that ignites and burns in the presence of a continuous oxygen flow and heat.

The device of the present disclosure may provide easier ignition to the combustible materials within the exothermic rod. The present disclosure achieves this without requiring additional rod attachments or tools.

The device of the present disclosure may be an exothermic cutting tool that may comprise a built-in assembly that can ignite the metal fuel/wire (also called exothermic tubes/wires/internal rods) by using magnesium, steel wool, and/or metal braid. The ignition end of the exothermic fuel rods may be wrapped with steel wool and/or magnesium, which may then be encapsulated with metal braid. The metal braid may then be wrapped with more steel wool. The entire assembly may be contained in a metal tube with a closed end that has a side window that may be used for igniting the assembly with an external ignition source. The ignition fuel may be entirely contained within the rod.

The device of the present disclosure may be ignited when an electrical spark, manual spark, and/or flame touches or is near the one or more side windows of the igniter assembly. The device of the present disclosure normally operates with oxygen flowing with a pressure of 50-90 psi, which helps ignite the ignition fuel. The steel wool and/or magnesium of the ignition fuel ignite, which in turn ignites and burns the metal exothermic tubes/rods/wires that are inside the rod. The heat and flame generated from the burning of the exothermic tubes/rods/wires may then be used to cut (via burning) a metal object.

One embodiment may be an exothermic cutting rod comprising: an ignition assembly portion; and a main portion; wherein the main portion may comprise a plurality of fuel rods and a rod housing that may be configured to allow a flow of oxygen to the ignition assembly portion; wherein the ignition assembly portion may comprise an ignition fuel housing and an ignition fuel; wherein the ignition fuel may be entirely contained within the exothermic cutting rod; wherein the ignition fuel housing has one or more windows that are configured to allow a heat source to ignite the ignition fuel; and wherein when the ignition fuel may be ignited by the heat source, the ignition fuel may be configured to then ignite the fuel rods. Preferably, the ignition fuel may comprise steel wool, a braid component, and one or more ignition enhancers. At least one of the one or more ignition enhancers may be magnesium. The one or more ignition enhancers may be selected from the group of ignition enhancers consisting of one or more of: metal shavings; metal shot; metal fragments; metal powder; metal foil; metal wire; metal wool; and/or combinations thereof. A burning end of the plurality of fuel rods may extend beyond the rod housing and extend into the ignition assembly housing. One or more of the plurality of fuel rods may be held in contact with the ignition fuel by the braid component. The ignition assembly portion may have a tip end and a main portion end, wherein the main portion end of the ignition assembly portion may be configured to matingly engage with a top end of the main portion of the exothermic cutting rod, and wherein the tip end of the ignition assembly portion may be sealed. The one or more windows may be on a side of the ignition assembly portion.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE EMBODIMENTS

Before the present methods and systems are disclosed and described, it is to be understood that the methods and systems are not limited to specific methods, specific components, or to particular implementations. The methods and systems disclosed and described herein may be understood more readily by reference to the following detailed description of preferred embodiments and the examples included therein and to the Figures and their previous and following description. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where the event or circumstance occurs and instances where it does not.

The term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item or result.

As used herein, the terms "approximately" and "about" generally refer to a deviance of within 5% of the indicated number or range of numbers. In one embodiment, the term "approximately" and "about" may refer to a deviance of between 0.001-10% from the indicated number or range of numbers. Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

As used herein, the term "heat source" refers to a flame, an electric arc, an oxy-acetylene torch, a butane lighter, friction-based spark source, sparker, or any other traditional source of heat/spark/flame for ignition.

As used herein, the term "rod housing" refers to a hollow metal or plastic tube, which may preferably be substantially cylindrical and elongated. The rod housing may preferably be configured to contain the fuel rods and, sometimes, portions of the ignition fuel. In some embodiments, the rod housing may be steel and/or may be anodized or coated in copper.

As used herein, the term "fuel rods" refers to exothermic tubes, wires, rods, and the like, which may preferably be made from steel or other metals or alloys, and which are configured to burn in the presence of a stream of pressurized oxygen at temperatures up to, or in excess of, 10,000 degrees Fahrenheit.

As used herein, the term "ignition fuel housing" refers to a hollow metal or plastic tube, which may preferably be substantially cylindrical and elongated. The ignition fuel housing may preferably be configured to contain the ignition fuel. In some embodiments, the ignition fuel housing may be steel and/or may be anodized or coated in copper. The ignition fuel housing may be configured to, at a bottom end, matingly engage with the burning end of the rod housing, and at a top end, be substantially sealed.

As used herein, the term "ignition fuel" refers to a more easily ignitable portion of the device of the present disclosure, which may comprise one or more of: (1) steel wool; (2) metal shot, powder, shavings, foil, wire, and/or fragments (which may preferably be steel, iron, aluminum, or an iron based alloy) (which may be an ignition enhancer); (3) a braid component (to bind the ignition fuel to be in contact with the fuel rods); (4) magnesium (which is an ignition enhancer); and (5) combinations thereof.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details.

Before the present methods and systems are disclosed and described in detail, it is to be understood that the methods and systems are not limited to specific methods, specific components, or to particular implementations. It is also to be understood that the terminology used herein is for the purpose of describing particular embodiments only and is not intended to be limiting.

To minimize the limitations in the cited references, and to minimize other limitations that will become apparent upon reading and understanding the present specification, the present specification discloses an exothermic rod with easier access to combustible materials within the rod.

Figure 1:
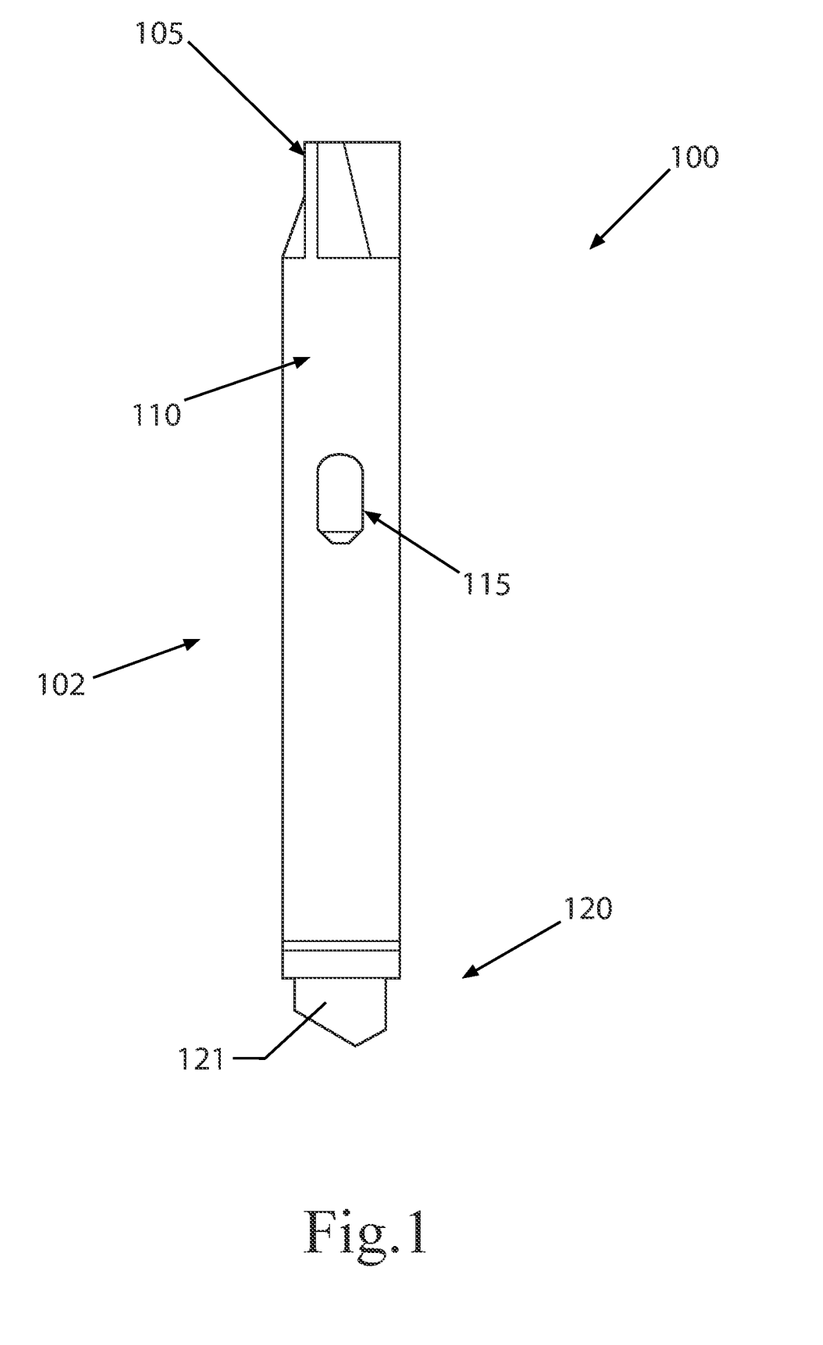
FIG. 1 is an illustration of a side view of a cutting end portion of one embodiment of an exothermic cutting rod with an ignition window.

FIG. 1 is an illustration of a side view of a cutting end portion of one embodiment of an exothermic cutting rod with ignition window. As shown in FIG. 1, one embodiment of the exothermic cutting rod 100 may comprise an ignition assembly portion 102 and main portion 120. The main portion 120 may comprise a rod housing 121, which may contain fuel rods. The ignition assembly portion 102 may comprise a sealed tip 105, and an ignition fuel housing 110 with an ignition window 115. Although only one ignition window 115 is shown, there may be multiple ignition windows. The tip 105 of the ignition fuel housing 110 may be crimped to close the assembly and the ignition fuel housing 110 may substantially encapsulate the ignition components of the ignition assembly portion 102. The ignition fuel housing 110 may comprise a material that may temporarily withstand the high temperatures caused when the fuel rods contained with the exothermic cutting rod 100 are ignited.

FIG. 1 shows that the ignition fuel housing 110 may have at least one ignition window 115. The ignition window 115 may provide access to the inside of the ignition fuel housing 110 for a heat source. When a heat source is directed into the ignition window 115, the ignition fuel within may ignite, which in turn, may ignite the fuel rods that are substantially within the rod housing 121.

Figure 2:
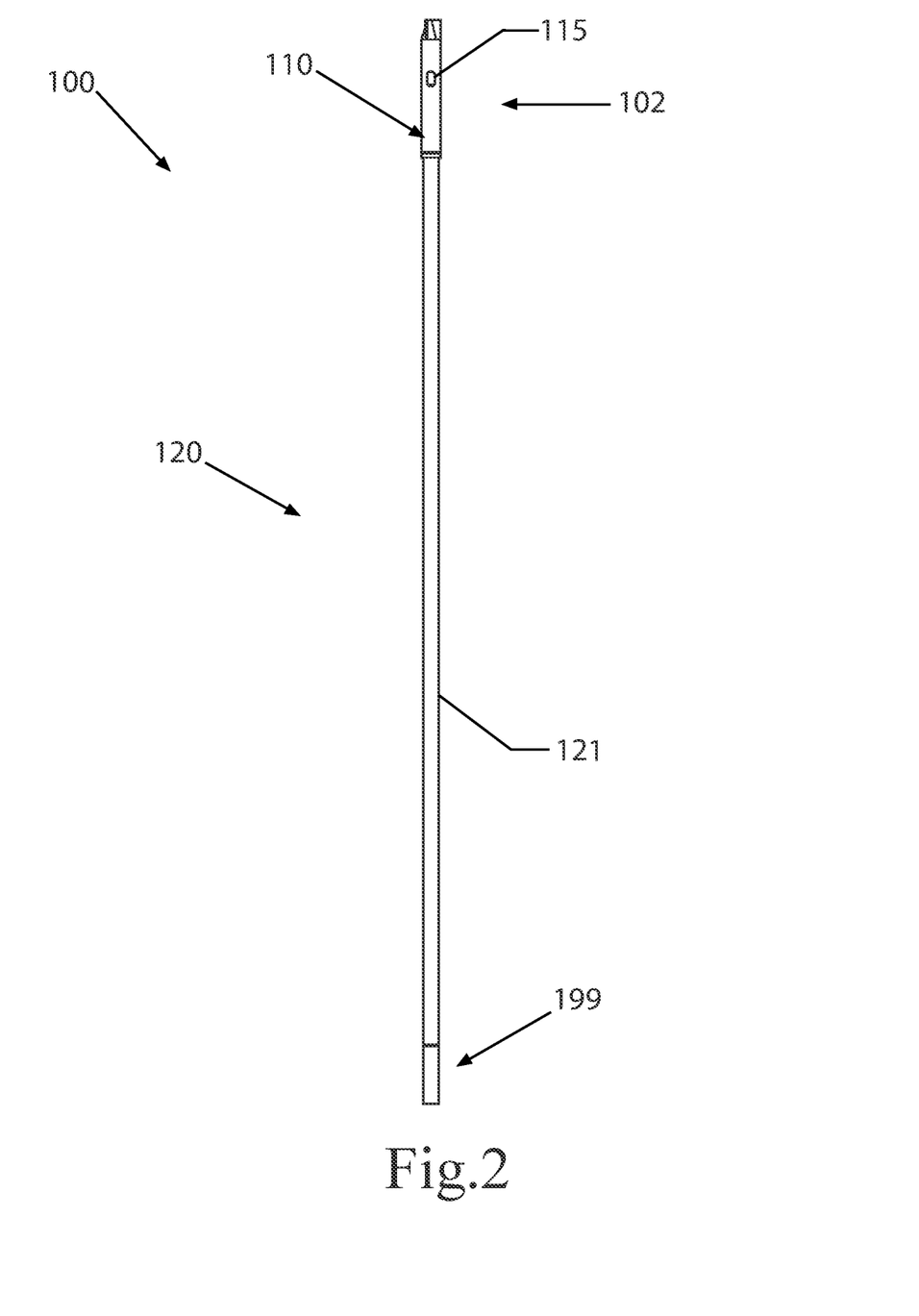
FIG. 2 is an illustration of a side view of one embodiment of an exothermic cutting rod with an ignition window.

FIG. 2 is an illustration of a side view of one embodiment of an exothermic cutting rod with ignition window. The cutting rod 100 may comprise the main portion 120, which may comprise the rod housing 121, which may contain a plurality of fuel rods. The rod housing 121 may have a bottom end 199 that intakes oxygen. As shown in FIG. 2 the top end of the rod housing 121 may matingly and sealingly engage with the bottom end of ignition fuel housing 110. FIG. 2 shows that no part of the ignition fuel is outside of the ignition fuel housing 110, but it may be accessed through window 115, in order to be ignited by a heat source. The window 115 also allows oxygen to vent out of the rod 100.

Figure 3:
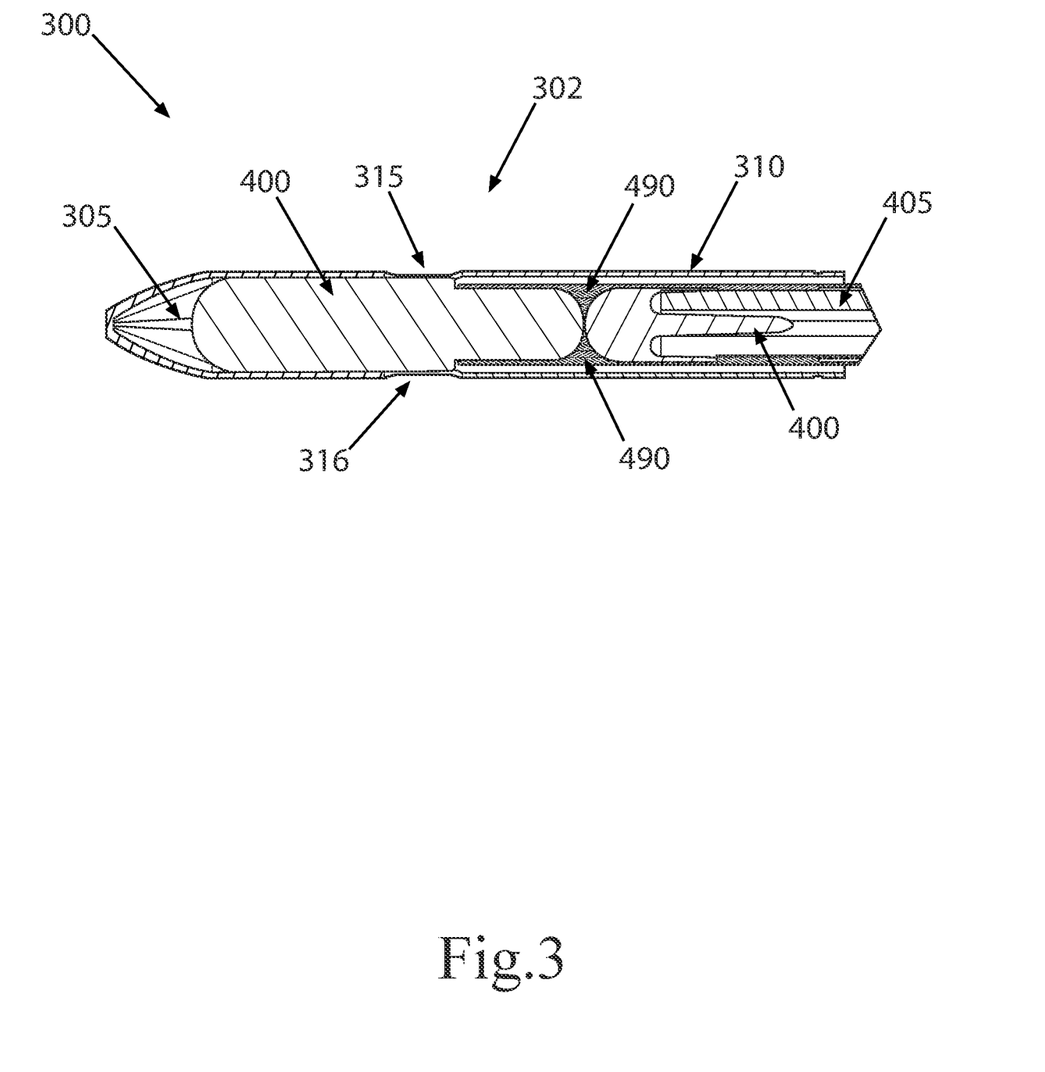
FIG. 3 is an illustration of a cross-section view of a cutting end portion of one embodiment of an exothermic cutting rod with an ignition window.

FIG. 3 is an illustration of a cross-section view of a cutting end portion of one embodiment of an exothermic cutting rod with ignition window. As shown in FIG. 3, the exothermic cutting rod 300 may comprise an ignition assembly portion 302, which may comprise an ignition fuel housing 310, which may have windows 315 and 316. Windows 315 and 316 are holes, apertures, or openings that allow access to the interior of the ignition fuel housing 310. The ignition assembly portion 302 may further comprise an ignition fuel 400 and braid component 490. The ignition fuel 400 may comprise steel wool and, preferably, one or more ignition enhancers, including, but not limited to, one or more of: metal fragments, metal powders, metal shavings, metal shot, metal foil, metal wire, and/or metal fragments (which may preferably be steel, iron, aluminum, or an iron-based alloy), magnesium, and combinations thereof. The braid component 490 may be used to bind the ignition fuel 400 to be in contact with one or more fuel rods 405. FIG. 3 shows that the ignition fuel 400 may be inserted down into the fuel rods 405 to better and more consistently ignite the fuel rods 405. FIG. 3 also shows how, preferably, the very ends of the fuel rods 405 are within the ignition housing 302 and are in direct contact with the ignition fuel 400. In some embodiments the braid component 490 may be a flat mild steel braid.

FIG. 3 shows how the ignition fuel 400 is entirely within the exothermic cutting rod 300, such that no part of the ignition fuel 400 is outside the exothermic cutting rod 300. But, the ignition fuel 400 is accessible and ignitable through the windows 315, 316 in the ignition fuel housing 310.

Figure 4:
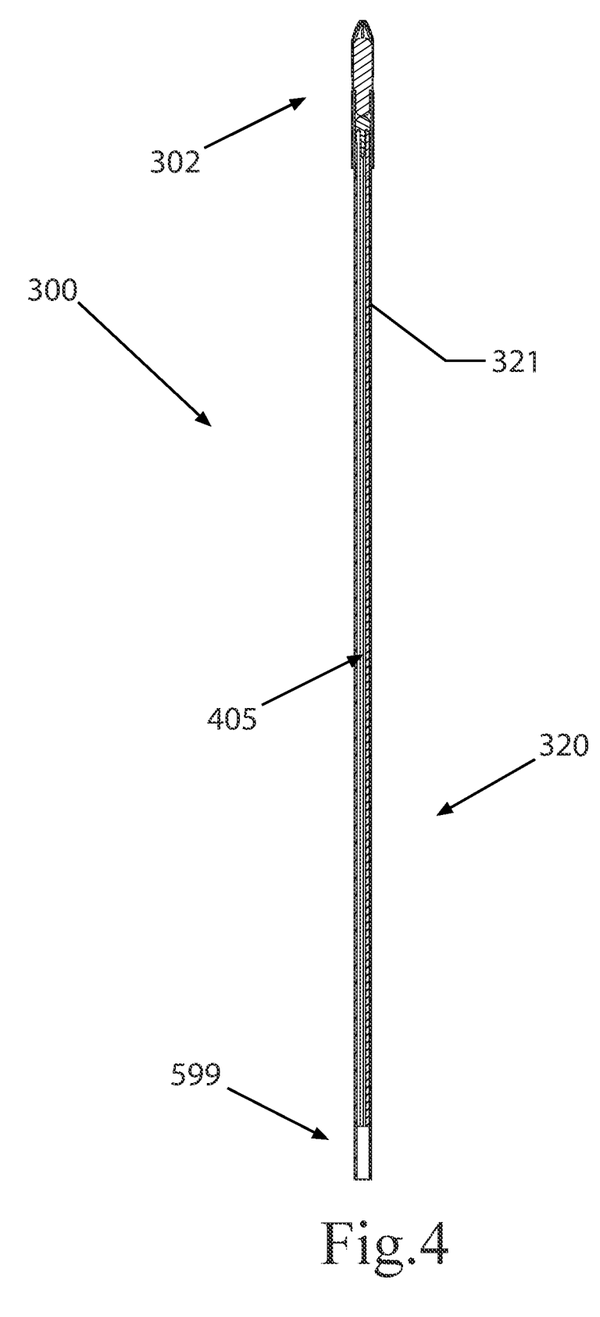
FIG. 4 is an illustration of a cross-section view of one embodiment of an exothermic cutting rod with ignition window.

FIG. 4 is an illustration of a cross-section view of one embodiment of an exothermic cutting rod with ignition windows. FIG. 4 shows that the exothermic cutting rod 300 may comprise the ignition assembly portion 302 and main portion 320. The ignition assembly portion 302 may connect to the main portion 320, which may comprise rod housing 321, which may contain fuel rods 405. The fuel rods 405 may span from ignition assembly portion 302 to the bottom end 599 of the fuel housing 321. The bottom end of 599 may be open to allow a stream of oxygen to enter.

Figure 5:
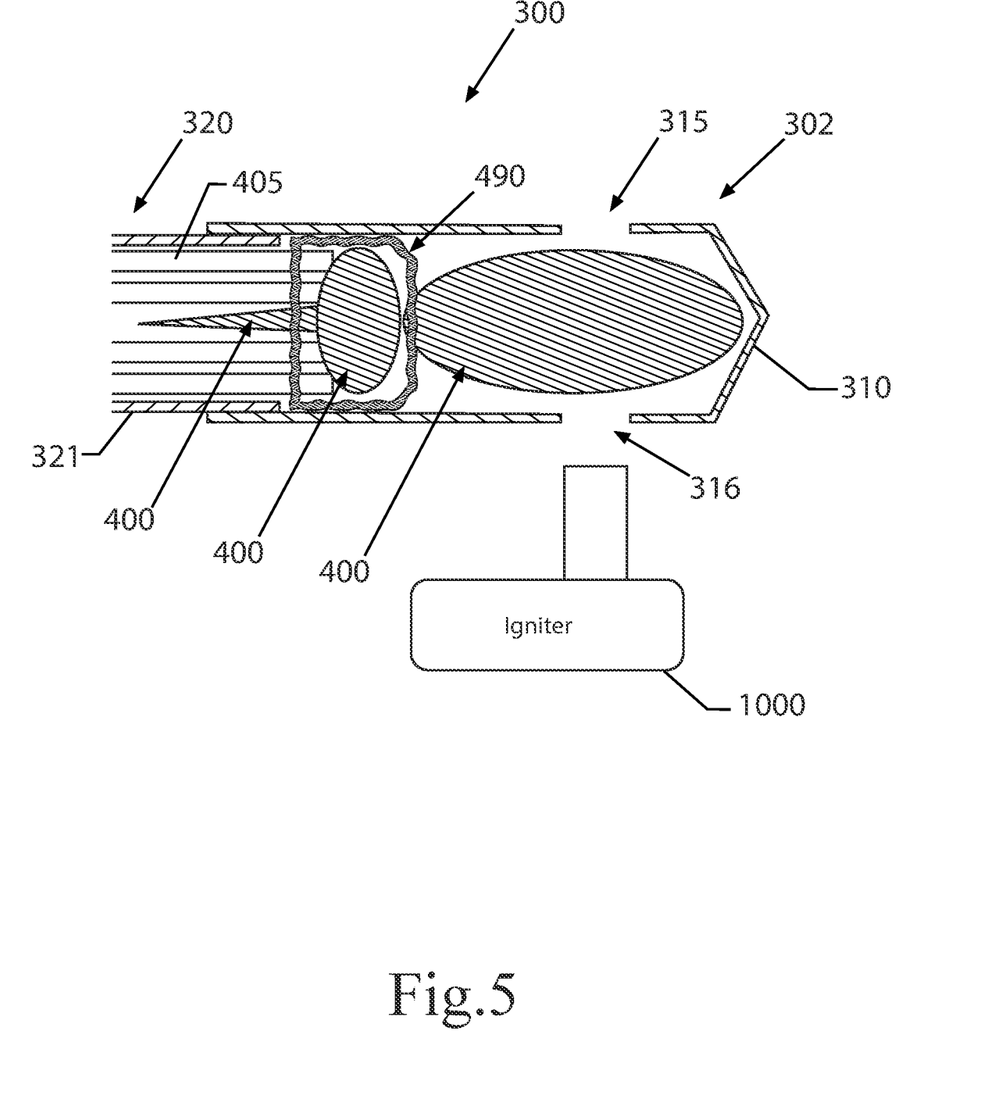
FIG. 5 is an illustration of a cross-section view of the burning end of one embodiment of an exothermic rod with two ignition widows.

FIG. 5 is an illustration of a cross-section view of the burning end of one embodiment of an exothermic cutting rod with two ignition widows and a heat source. As shown, the exothermic cutting rod 300 may comprise the ignition assembly portion 302 and main portion 320. The ignition assembly portion 302 may fittingly engage with the main portion 320, such that it acts as a cap to the main portion 320. The top ends of fuel rods 405 are shown extending beyond the rod housing 321 and into the ignition assembly portion 302. Within the ignition assembly portion 302, the fuel rods 405 may engage with or come in close proximity to the ignition fuel 400, such that when heat source 1000 is used to ignite the ignition fuel 400, the ignition fuel 400 in turn ignites the fuel rods 405. FIG. 5 shows that the ignition fuel is entirely contained within the exothermic cutting rod 300 and no part of the ignition fuel is outside the exothermic cutting rod 300. Preferably the ignition fuel 400 may engage with a metal braid component 490, which may itself be part of the ignitable fuel, and the ignition fuel 400 may comprise various ignitable metal materials, including, but not limited to: wool, shot, foil, wire, shavings, powder, and/or fragments. Preferably the ignition fuel 400 is primarily steel wool, but it may have various ignition enhancers, such as magnesium and other metal fragments or powders. The ignition enhancing metal fragments, powders, shavings, and shot may be steel, iron, aluminum, iron alloys, and the like.

Figure 6:
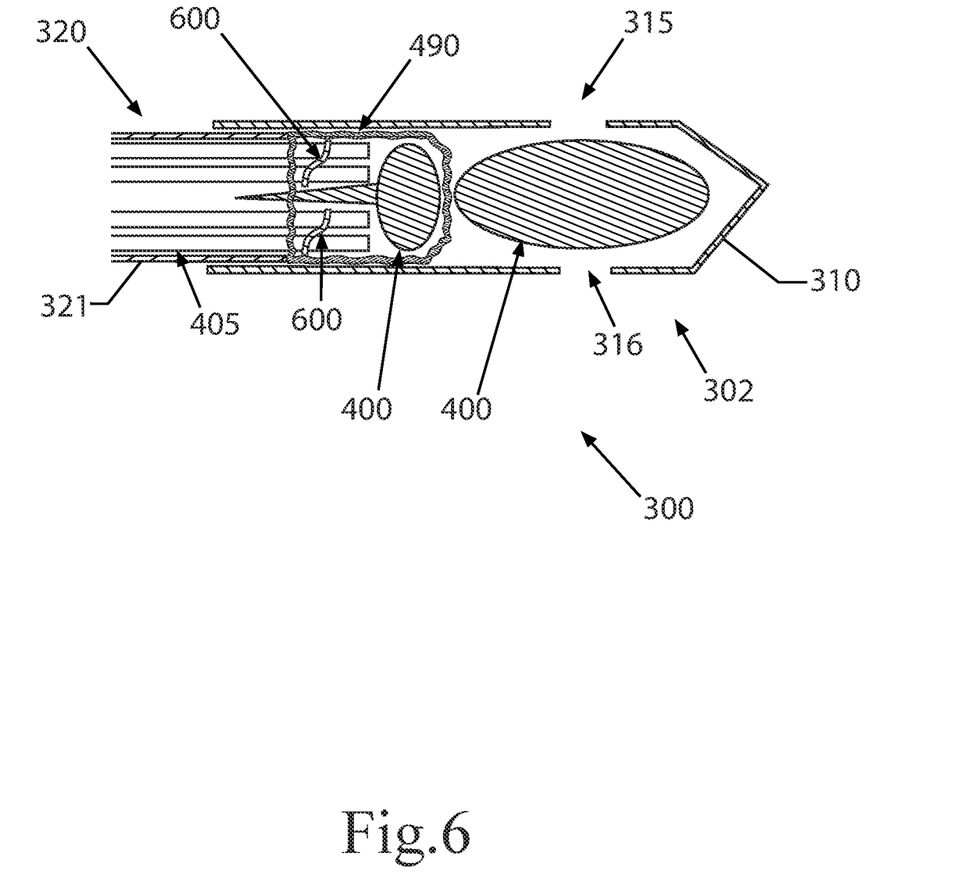
FIG. 6 is an illustration of a cross-section view of the burning end of another embodiment of an exothermic rod with two ignition widows.

FIG. 6 is an illustration of a cross-section view of the burning end of another embodiment of an exothermic rod. FIG. 6 shows that the ignition fuel housing 310 may have at least two windows 315, 316, which may allow air and/or oxygen to vent/enter and which may allow access to a heat source, which may be a manual, automatic, digital, or analog spark and/or flame generator. As shown, the exothermic cutting rod 300 may comprise the ignition assembly portion 302 and main portion 320. The ignition assembly portion 302 may comprise the ignition fuel housing 310, ignition fuel 400, braid 490, and magnesium 600. Magnesium burns at about 4000° F., with an autoignition temperature of 883° F. so it is helpful in reaching the temperatures needed to ignite the fuel rods 405. The magnesium 600, which may be in fragments, pieces, wire, wool, flecks, powder, or shavings, is an ignition enhancer.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. An exothermic cutting rod comprising:
an ignition assembly portion; and
a main portion;
wherein said main portion comprises a plurality of fuel rods and a rod housing that is configured to allow a flow of oxygen to said ignition assembly portion;
wherein said ignition assembly portion comprises an ignition fuel housing and an ignition fuel;
wherein said ignition fuel is entirely contained within said exothermic cutting rod;
wherein said ignition fuel comprises steel wool;
wherein said ignition fuel further comprises a braid component;
wherein said ignition fuel housing has one or more windows that are configured to allow a heat source to ignite said ignition fuel; and
wherein when said ignition fuel is ignited by said heat source, said ignition fuel is configured to then ignite said fuel rods.

2. The exothermic cutting rod of claim 1, wherein said ignition fuel further comprises one or more ignition enhancers.

3. The exothermic cutting rod of claim 2, wherein at least one of said one or more ignition enhancers is magnesium.

4. The exothermic cutting rod of claim 2, wherein said one or more ignition enhancers are selected from the group of ignition enhancers consisting of: metal shavings; metal shot; metal fragments; metal powder; metal foil; metal wire; metal wool; and metal fragments.

5. The exothermic cutting rod of claim 2, wherein a burning end of said plurality of fuel rods extend beyond said rod housing and extend into said ignition assembly housing.

6. The exothermic cutting rod of claim 2, wherein one or more of said plurality of fuel rods are held in contact with said ignition fuel by said braid component.

7. The exothermic cutting rod of claim 2, wherein said ignition assembly portion has a tip end that is sealed.

8. The exothermic cutting rod of claim 2, wherein said one or more windows are on a side of said ignition assembly portion.

9. An exothermic cutting rod comprising:
an ignition assembly portion; and
a main portion;
wherein said main portion comprises a plurality of fuel rods and a rod housing that is configured to allow a flow of oxygen to said ignition assembly portion;
wherein said ignition assembly portion comprises an ignition fuel housing and an ignition fuel;
wherein said ignition fuel is entirely contained within said exothermic cutting rod; wherein said ignition fuel housing has one or more windows that are configured to allow a heat source to ignite said ignition fuel;
wherein when said ignition fuel is ignited by said heat source, said ignition fuel is configured to then ignite said fuel rods; wherein said ignition fuel comprises steel wool, a braid component, and one or more ignition enhancers; and
wherein said one or more windows are on a side of said ignition assembly portion.

10. The exothermic cutting rod of claim 9, wherein at least one of said one or more ignition enhancers is magnesium.

11. The exothermic cutting rod of claim 9, wherein said one or more ignition enhancers are selected from the group of ignition enhancers consisting of: metal shavings; metal shot; metal fragments; metal powder; metal foil; metal wire; and metal wool.

12. The exothermic cutting rod of claim 9, wherein a burning end of said plurality of fuel rods extend beyond said rod housing and extend into said ignition assembly housing.

13. The exothermic cutting rod of claim 9, wherein one or more of said plurality of fuel rods are held in contact with said ignition fuel by said braid component.

14. The exothermic cutting rod of claim 9, wherein said ignition assembly portion has a tip end that is sealed.

15. An exothermic cutting rod comprising:
an ignition assembly portion; and
a main portion;
wherein said main portion comprises a plurality of fuel rods and a rod housing that is configured to allow a flow of oxygen to said ignition assembly portion;
wherein said ignition assembly portion comprises an ignition fuel housing and an ignition fuel;
wherein said ignition fuel is entirely contained within said exothermic cutting rod;
wherein said ignition fuel housing has one or more windows that are configured to allow a heat source to ignite said ignition fuel;
wherein when said ignition fuel is ignited by said heat source, said ignition fuel is configured to then ignite said fuel rods;
wherein said ignition fuel comprises steel wool, a braid component, and one or more ignition enhancers;
wherein said one or more windows are on a side of said ignition assembly portion;
wherein said one or more ignition enhancers are selected from the group of ignition enhancers consisting of: magnesium; metal shavings; metal shot; metal fragments; metal powder; metal foil; metal wire; and metal wool; and
wherein one or more of said plurality of fuel rods are held in contact with said ignition fuel by said braid component.

16. The exothermic cutting rod of claim 15, wherein a burning end of said plurality of fuel rods extend beyond said rod housing and extend into said ignition assembly housing.

17. The exothermic cutting rod of claim 15, wherein said ignition assembly portion has a tip end that is sealed.

* * * * *